(12) United States Patent
Scarlata et al.

(10) Patent No.: US 12,346,674 B2
(45) Date of Patent: *Jul. 1, 2025

(54) ATTESTATION OF OPERATIONS BY TOOL CHAINS

(71) Applicant: Intel Corporation, Santa Clara, CA (US)

(72) Inventors: Vincent Scarlata, Beaverton, OR (US); Alpa Trivedi, Portland, OR (US); Reshma Lal, Hillsboro, OR (US); Marcela S. Melara, Hillsboro, OR (US); Michael Steiner, Portland, OR (US); Anjo Vahldiek-Oberwagner, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 18/307,257

(22) Filed: Apr. 26, 2023

(65) Prior Publication Data

US 2023/0333824 A1    Oct. 19, 2023

Related U.S. Application Data

(63) Continuation of application No. 17/133,880, filed on Dec. 24, 2020, now Pat. No. 11,650,800.

(51) Int. Cl.
*G06F 8/40* (2018.01)
(52) U.S. Cl.
CPC ....................................... *G06F 8/40* (2013.01)

(58) Field of Classification Search
None
See application file for complete search history.

(56) References Cited

U.S. PATENT DOCUMENTS 10,735,205 B1 *  8/2020  Wentz ................ H04L 9/3257
11,057,361 B2    7/2021  Harnik
(Continued)

FOREIGN PATENT DOCUMENTS

DE    102021133816 A1    6/2022

OTHER PUBLICATIONS

Notification of Publication for Chinese Application No. 202111393739.X, Publication No. CN114675828, mailed Jul. 4, 2022, 28 pages.
(Continued)

*Primary Examiner* — Marina Lee
(74) *Attorney, Agent, or Firm* — JAFFERY WATSON HAMILTON & DESANCTIS LLP

(57) ABSTRACT

Attestation of operations by tool chains is described. An example of a storage medium includes instructions for receiving source code for processing of a secure workload of a tenant; selecting at least a first compute node to provide computation for the workload; processing the source code by an attestable tool chain to generate machine code for the first compute node, including performing one or more conversions of the source code by one or more convertors to generate converted code and generating an attestation associated with each code conversion, and receiving machine code for the first compute node and generating an attestation associated with the first compute node; and providing each of the attestations from the first stage and the second stage for verification.

20 Claims, 10 Drawing Sheets

(56) References Cited

U.S. PATENT DOCUMENTS

| | | |
|---|---|---|
| 11,509,486 B2 | 11/2022 | Fallah |
| 11,650,800 B2 * | 5/2023 | Scarlata .................. G06F 21/64 |
| | | 717/140 |
| 11,741,224 B2 * | 8/2023 | Smith ..................... G06F 21/64 |
| | | 726/22 |
| 2015/0039891 A1 | 2/2015 | Ignatchenko |
| 2018/0330079 A1 | 11/2018 | Gray |
| 2020/0134192 A1 | 4/2020 | Gupta |
| 2021/0334367 A1 | 10/2021 | Chibon |
| 2021/0374234 A1 | 12/2021 | Bursell |
| 2022/0027458 A1 | 1/2022 | Caldarale |
| 2022/0035904 A1 | 2/2022 | Bursell |
| 2024/0036902 A1 * | 2/2024 | Dewan .................. H04L 9/0894 |
| 2024/0045968 A1 * | 2/2024 | Sood ........................ G06F 9/505 |

OTHER PUBLICATIONS

Title: A protocol for property-based attestation, Author L Chen, Published 2006.
Title: A remote attestation protocol with Trusted Platform Modules (TPMs) in wireless sensor networks. Author: H Tan, published 2015.
Title: SCOBA: source code based attestation on custom software, Author: L Gu, et al., published 2010.
Title: Software component certification, Author: J. Morris, et al., published 2001.

* cited by examiner

ATTESTATION OF OPERATIONS BY TOOL CHAINS

CLAIM TO PRIORITY

This Application is a continuation of and claims the benefit of and priority to U.S. application Ser. No. 17/133,880, entitled ATTESTATION OF OPERATIONS BY TOOL CHAINS, by Vincent Scarlata, et al., filed Dec. 24, 2020, now issued as U.S. Pat. No. 11,650,800, the entire contents of which are incorporated herein by reference.

TECHNICAL FIELD

Embodiments described herein generally relate to the field of electronic devices and, more particularly, attestation of operations by tool chains.

BACKGROUND

Cloud service providers (CSPs) are increasingly expanding services to new customers, including services to security conscious customers that have been hesitant in the past to leverage cloud services. This has driven a trend of CSPs offering confidential computing services built on trusted computing techniques.

Simultaneously, cloud service providers are expanding their computing devices from only CPUs (Central Processing Units) to a wide variety of other types of compute nodes, including various processing units and hardware accelerators. To leverage these heterogeneous computing environments, providers are further supporting the establishment of tool chains that allow a customer to write their business logic in such a way that the tool chain can then compile it for any of these accelerators.

However, these trends do not inherently work well together, Confidential computing enables a computing device to attest to logic that it is running with the expectation that the customer will recognize it, while code deployment via a tool chain results in the code that a computing node is running being a derivative of the code provided by the customer, rather than the customer's code itself.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
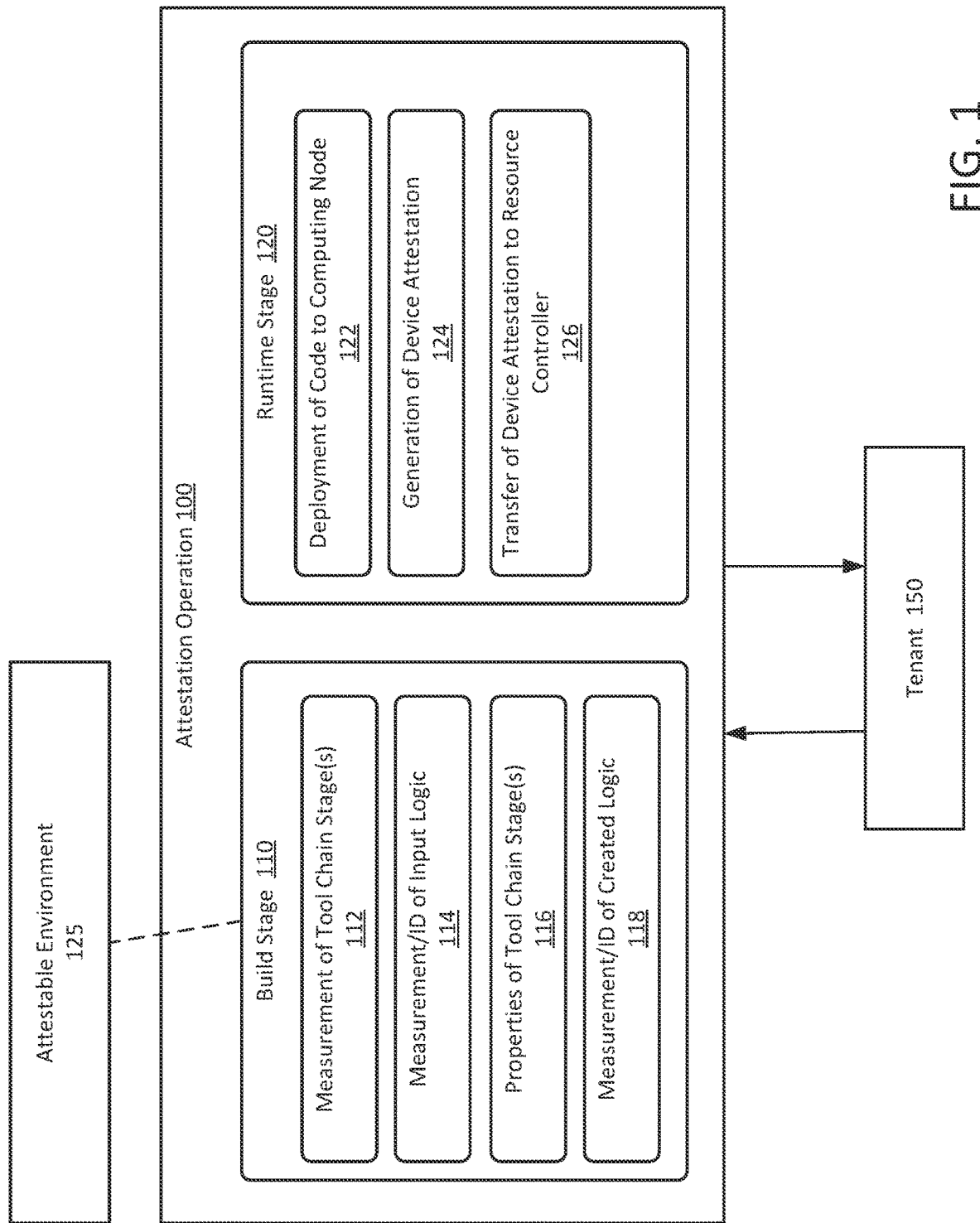
FIG. 1 is an illustration of attestation of operations associated with tool chains, according to some embodiments.

Embodiments described herein are directed to attestation of operations by tool chains.

In order to expand services to security conscious customers, cloud service providers (CSPs) may offer confidential computing services built on trusted computing techniques, such as using stronger isolation technologies between customer workloads and the ability for computing devices to attest to the customer that, for example, compute nodes are up to date with respect to patching, the relevant compute nodes are applying these technologies to protect the workload, and that the workload being processed is the logic the customer intends to deploy and has not been tampered with. The customer can then verify this attestation before releasing sensitive data to the compute nodes.

However, CSP support is expanding from operation by CPUs (Central Processing Units) to operation by a wide variety of compute nodes, including multiple types of processing devices (such as GPUs (Graphical Processing Units) and hardware accelerators (such as FPGAs (Field-Programmable Gate Arrays) and ASICs (Application Specific Integrated Circuits)), that may enable increased performance for certain workloads. To fully leverage these heterogeneous computing environments, the establishment of tool chains (such as Intel® oneAPI toolkit and others) is supported to allow a customer to write the customer's business logic (initial source code) in such a way that the attestable tool chain can then compile or translate it (which may in general be referred to as conversion of the code logic) for any of such processing units and hardware accelerators. As used herein, "attestable tool chain" refers in general to a set of programming tools or utilities to perform an operation, and, in particular, a tool chain may be applied to convert source code into machine code for multiple different types of compute nodes. A tool chain may also combine the source code with other code such as a runtime or libraries. An attestable tool chain may be able to create attestations that may include information about the operation the tool chain conducted.

This tool chain support may be a point of differentiation for CSPs, as a CSP can enable a customer to write device-agnostic source code, while the CSP will determine the best hardware the CSP has available to execute that code, and apply the applicable tool chain to convert the logic written by the customer into machine code that can run on the specific compute node for deployment, whether the compute node is a CPU, GPU, FPGA, or other dedicated accelerator.

However, an API-style code deployment results in the code that the designated compute node is running being a derivative of the code provided by the customer, rather than the customer's code itself. For this reason, confidential computing in a heterogenous cloud computing platform should provide an attestation process that supports device agnostic tool chain operation. Previous solutions to this problem require the tenant to pre-determine the accelerator type that will run their logic, build for it, and then provide that code to the CSP. This conventional model may operate sufficiently well for certain simple workloads wherein the selection of compute unit can be pre-determined, but workloads may be composed of multiple independent elements working together, requiring a more sophisticated operation. Further, cloud providers may wish to differentiate from other providers by offering easy to use heterogeneous environments, and thus have a strong desire to take on the burden of determining which compute nodes are best to run workloads on.

In some embodiments, an apparatus, system, or process is to provide attestation of compilation, translation, or evaluation by an attestable tool chain. In some embodiments, the apparatus, system, or process utilizes one or more attestable environments to generate attestations of each stage of processing by the attestable tool chain, and produce a chain of attestation assertions that trace from the customer-recognizable workload to the machine logic to be utilized on the end compute nodes. In such operation, a customer is then able to apply the chain of attestations to trace the logic running on the end device back through the tool chain to the original logic provided or recognized by the customer.

Figure 7:
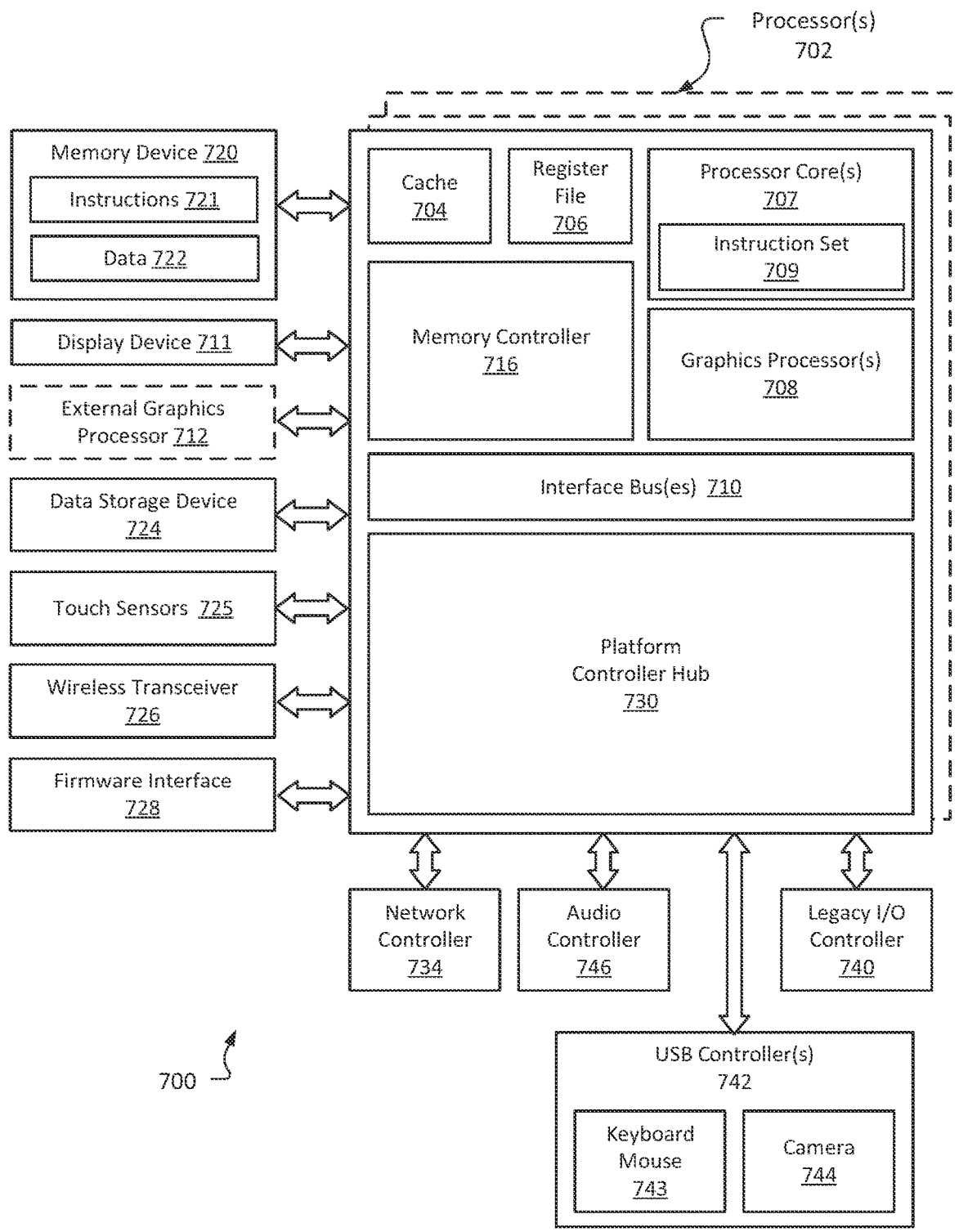
FIG. 7 illustrates an embodiment of an exemplary computing architecture for attestation of operations by tool chains, according to some embodiments.

FIG. 1 is an illustration of attestation of operations associated with tool chains, according to some embodiments. In some embodiments, the process may be performed by one or more computing systems, such as a computing system as illustrated in FIG. 7. In some embodiments, an attestation operation 100 may be decomposed into two stages: a Build Stage 110 (a first stage) where device code logic is generated, and a Runtime Stage 120 (a second stage) where a confidential computing attestation occurs.

In the Build Stage 110, an attestable tool chain is run from one or more attestable environments 125. As used herein, "attestable environment" refers to an environment that is capable of attesting certain operations, including the generation of code. The attestable environment may include, but is not limited to, Trusted Execution Environment (TEE) technologies, such as Intel® Software Guard Extensions (Intel® SGX), Intel® Trusted Domain Extensions (Intel® TDX), or AMD SEV. The tool chain may include multiple stages that are applied in the generation of code for an end device. In some embodiments, while processing the workload, each tool chain stage creates an attestation that a following stage may utilizes, wherein the attestation may include:

(a) Measurement of the particular tool chain stage 112, which may include any known code measurement technology; and
(b) Measurements or identification of the input logic to be converted (compiled or translated), inspected, or otherwise processed by the attestable tool chain 114.

In some embodiments, the attestation may optionally include other factors, such as one or more of:

(c) Any properties that the tool chain stage either guarantees (for example, by inserting code or linking to specific libraries) or has discovered (for example, by inspection of the logic) 116, or
(d) Measurements or identification of the logic that was created as a result of the stage (unless, for example, the tool chain stage was strictly an inspection stage, and thus did not create new code) 118.

In some embodiments, in the Runtime Stage 120, an attestation is generated for the customer. In some embodiments, the Runtime Stage 120 includes a traditional Trusted Computing or Confidential Computing deployment. In general, Confidential Computing protects data in use by performing computation in a hardware-based Trusted Execution Environment. In operation by the tool chain, generated code is deployed to a specific computing node 122. The generated code may require access to a certain resource held by a resource controller, such as the tenant 150, wherein the tenant 150 may have access to sensitive date needed by the compute node to execute the device logic on the intended data. In some embodiments, the operation includes generation of a device attestation by the compute node 124, and transfer of the attestation to the resource controller 126.

In some embodiments, the full attestation of the operation of the tool chain can be assembled into a transitive chain of events, which may be referred to as the attestation chain, to be verified by a particular verifying agent (referred to as the verifier), wherein the verifier may include, for example, the tenant 150 or a designated verifying agent acting on behalf of the tenant. The verifier is to provide operations including:

(a) Verifying each attestation in the attestation chain, where the verification may be performed using any known attestation process, and
(b) Ensuring that the chain of events leads from some recognized logic, the recognized logic being the original workload code, to the logic that is reflected in the device attestation.

In some embodiments, the resulting attestation chain can be processed as evidence that the attesting device is running logic derived from the original business logic, optionally with the specified security properties, and was built by the indicated tool chain elements. If these elements all meet the verifier's policy, the operation may proceed with deploying confidential data for the workload computation.

Figure 2:
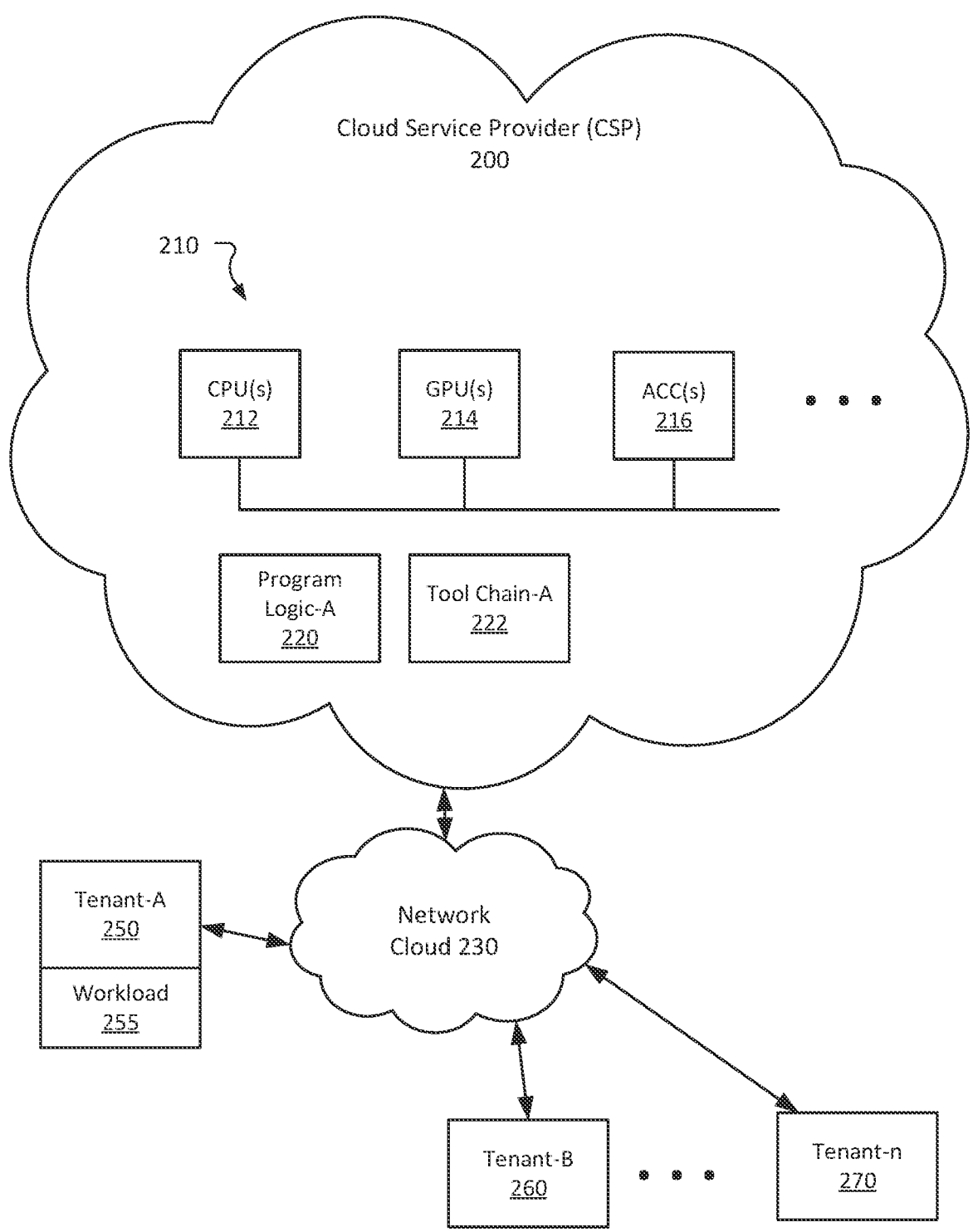
FIG. 2 is an illustration of the application of a tool chain to generate a chain of attestation assertions for code to be run on an end compute node, according to some embodiments.

FIG. 2 is an illustration of the application of a tool chain to generate a chain of attestation assertions for code to be run on an end compute node, according to some embodiments. As illustrated in FIG. 2, a cloud service provider 200 includes multiple compute nodes 210 to support the operation of a workload of a customer, such as Tenant-A 250 with associated workload 255. The multiple compute nodes 210 may include, for example, a heterogeneous set of devices, including multiple types of processing devices, hardware accelerators, or both, illustrated as one or more CPUs 212, one or more GPUs 214, and one or more hardware accelerators 216. The cloud service provider 200 (or other third party) may operate to support the workload 255 utilizing any combination of the available compute nodes 210. The CSP may be serving a large number of customers, such as additional customers shown as Tenant-B 260 through Tenant-n 270, wherein each of such customers may be providing a different workload for processing, wherein each such workload may potentially be associated with a tool chain for conversion of source code into appropriate machine code for one or more compute units.

As illustrated, Tenant-A 250 may provide or select an attestable tool chain, illustrated as Tool Chain-A 222, to convert workload code (source code), shown as Program Logic-A 220, into one or more sets of machine code for one or more of the multiple types of compute nodes. In this manner, the workload 255 may potentially be processed using a variety of different compute nodes without the customer needing to identify such devices and to use this knowledge in generation of the program logic 220, i.e., the program logic can be device agnostic. The Program Logic-A 220 needs to be converted into machine code for each of one or more of the compute nodes that are selected for operation on the workload 255 associated with Tenant-A 250.

In conventional operation, in order for a customer, such as Tenant-A 250, to recognize and verify the machine logic running on each end device, the customer would be required to run the tool chain and generate the resulting machine code for verification of such code. It is possible for this model of operation to be supported for certain tool chains in compiling their own code. However, for hardware accelerators, FPGA "compilers", or similar elements, this process would require knowledge of the CSP's base bitstream, and GPUs would require knowledge of the CSP's potentially customized kernel. Such operations thus are not generally practical in a CSP environment.

In some embodiments, an apparatus, system, or process is to run the tool chain for a customer from one or more attestable environments. While processing the workload, the tool chain stages are to create an attestation of that stage, asserting that tool chain has converted the input code into the output code. In some embodiments, attestations may optionally further include any security assertions that the tool chain can make about the resulting code. This thus produces a chain of attestation assertions starting with the customer-recognizable workload, and continuing to the logic that will be running on the end device. During workload deployment, when a customer receives an attestation from the end compute node, the customer will be able to apply this chain of attestations to trace the logic running on the end device back through the tool chain to the original logic provided or recognized by the customer.

In some embodiments, a tool chain thus may be executed at any location, be it by the customer, by a CSP, by a governing body, or a mutually agreed upon third party, without requiring the build process to be deterministic and repeatable. Instead, the chain of attestations provide the needed data to attest the conversion or evaluation by the tool chain from the initial logic to the logic for execution by the end devices.

Figure 3:
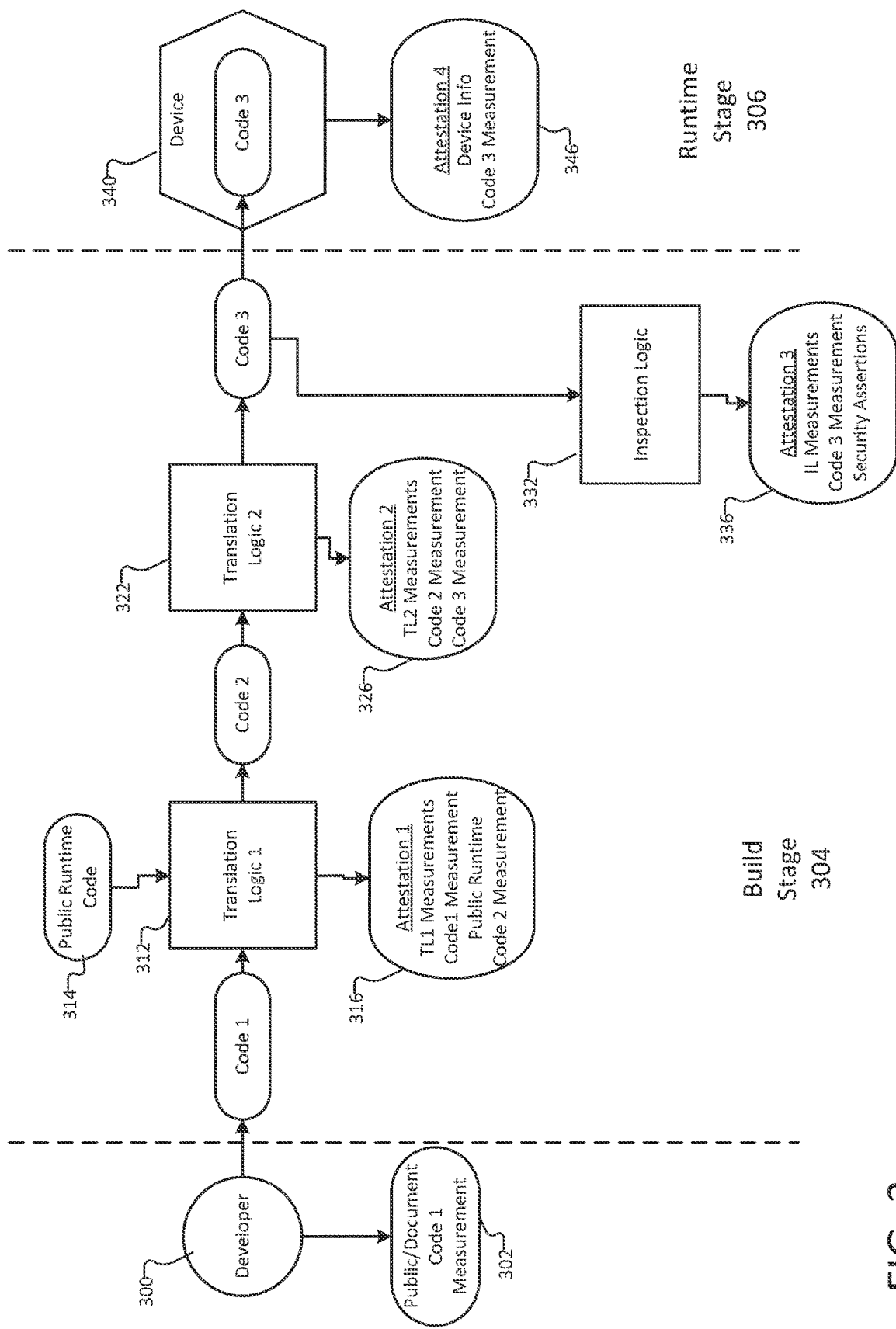
FIG. 3 is an illustration of the generation of attestations by an attestable tool chain, according to some embodiments.

FIG. 3 is an illustration of the generation of attestations by an attestable tool chain, according to some embodiments. In some embodiments, initial business logic (source code), shown as Code 1, may be created by a developer 300 (which may be a tenant, or may be a third party developer). In this illustration, Code 1 is the initial code for processing of a secure workload, wherein Code 1 needs to be converted into machine code for a particular end computing node, wherein the conversion (i.e., compilation or translation) is to be performed utilizing an attestable tool chain, such as Tool Chain-A 222 illustrated in FIG. 2. Developer 300 may provide a public document 302 that provides a measurement related to Code 1 that can be utilized in verification of operation of the tool chain.

In some embodiments, the chain tool may include one or more stages, wherein each stage (which may be a conversion stage to convert and attest code or an inspection stage to inspect code without providing translation) may generate an attestation of the code. For example, as illustrated in FIG. 3, in a Build Stage 304 the Code 1 is received by Translation Logic 1 (312) (wherein the translation logic may also be referred to as a first conversion, or a first convertor) to perform a conversion of Code 1 to generate Code 2, and to generate Attestation 1 (316). Translation Logic 1 may further receive code such as a public runtime code 314. In this example, the generated Attestation 1 may include a Translation Logic 1 (TL1) measurement (i.e., a measurement associated with the Translation 1 stage itself), a Code 1 measurement (a measurement associated with the received Code 1), a public runtime code measurement (a measurement associated with the received public runtime code), and a Code 2 measurement (a measurement associated with the generated Code 2).

The illustrated operation may continue with Code 2 being received by Translation Logic 2 (322) (a second convertor) to perform a translation of Code 2 to generate Code 3 (Code 3 being the machine code for an end compute node in this particular example), and to generate Attestation 2 (326). Attestation 2 may include a Translation Logic 2 (TL2) measurement, a Code 2 measurement, and a Code 3 measurement. Further, Code 3 may further be inspected by Inspection Logic 332 (a first inspection element) to generate Attestation 3 (336), which may include an Inspection Logic (IL) measurement, a Code 3 measurement, and further may include certain security assertions.

In some embodiments, in a Runtime stage 306 the Code 3 may be received by the end compute node, shown as device 340. In some embodiments, the device 340 is to generate Attestation 4 (the device attestation), which may include information regarding the device 340 and a Code 3 measurement.

In some embodiments, the generated attestations, which are Attestation 1 generated by Translation Logic 1, Attestation 2 generated by Translation Logic 2, Attestation 3 generated by Inspection Logic 332, and Attestation 4 generated by end computing device 340, may each be provided to a verifier, wherein the verifier may be the tenant or a verifying agent acting on behalf of the tenant. The attestations may together form an attestation chain to attest that the attesting device (device 340 in this example) is running logic (Code 3) that is derived from the original business logic (Code 1), and was built by the indicated tool chain elements (Translation Logic 1 and Translation Logic 2). The verifier may then determine whether the attestations all meet the verifier's policy, and, if so, the tenant (or other party) may proceed with deploying data to the workload for processing by the device 340.

Figure 4:
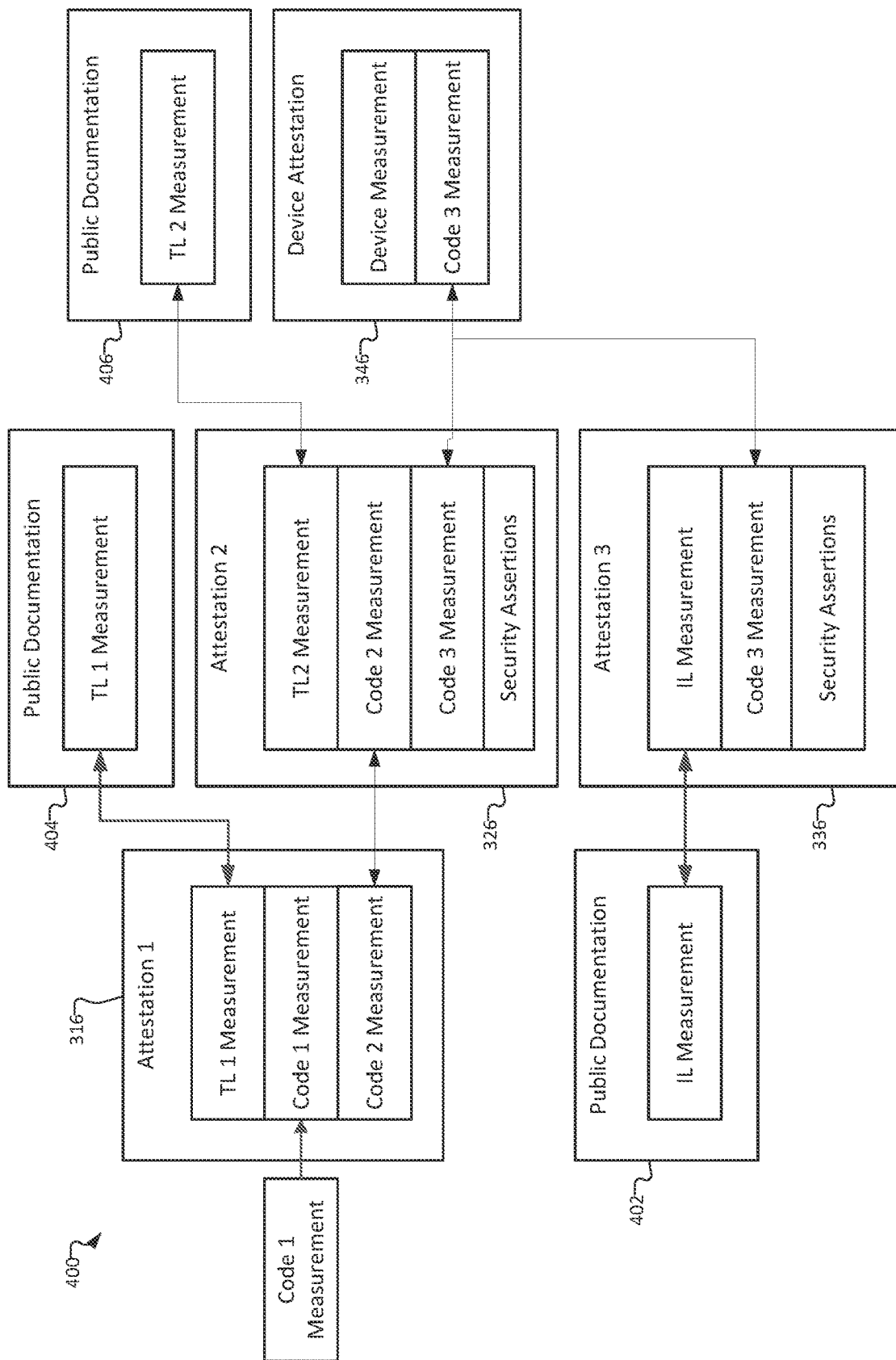
FIG. 4 is an illustration of measurements and attestations associated with operation of an attestable tool chain, according to some embodiments.

FIG. 4 is an illustration of measurements and attestations associated with operation of an attestable tool chain, according to some embodiments. In some embodiments, the measurements and attestations 400 are derived from stages of an attestable tool chain and an end computing node, as these are illustrated in FIG. 3.

In some embodiments, Attestation 1 316, as generated by Translation Logic 1 in FIG. 3, includes a TL 1 (Translation Logic 1) measurement, a received Code 1 measurement, and a Code 2 measurement. For verification, the Code 2 measurement may be compared with an input logic measurement for Attestation 2 326. In addition, the author or developer of the tool chain may provide public documentation including measurements for the tool chain that may be utilized by the tenant or a verifier for comparison of generated measurements. The public documentation may include, but is not limited to, the illustrated documentation of a TL 1 measurement 404, documentation of a TL 2 (Translation Logic 2) measurement 406, and documentation of an IL (Inspection Logic) measurement 402.

Attestation 2 326, as generated by Translation Logic 2 in FIG. 3, includes a TL 2 (Translation Logic 2) measurement, the received Code 2 measurement, and a Code 3 measurement. Attestation 2 326 may further include one or more security assertions. For verification, the Code 3 measurement may be compared with an input logic measurement for Device Attestation 346.

Attestation 3 336, as generated by Inspection Logic 332 in FIG. 3, includes an IL measurement and a generated Code 3 measurement. For verification, the Code 3 measurement may be compared with an input logic verification for Device Attestation 346.

The Device Attestation 346 (Attestation 4 illustrated in FIG. 3) then includes a device measurement (for the end processing device) and a Code 3 measurement.

In some embodiments, as described with regard to FIG. 3, the generated attestations, Attestation 1 generated by Translation Logic 1, Attestation 2 generated by Translation Logic 2, Attestation 3 generated by Inspection Logic, and Device Attestation generated by the end computing node, may each be provided to a verifier. The attestations may together form an attestation chain to attest that each attesting device is running logic that is derived from the original business logic (Code 1), and was built by the indicated tool chain elements (Translation Logic 1 and Translation Logic 2).

Figure 5:
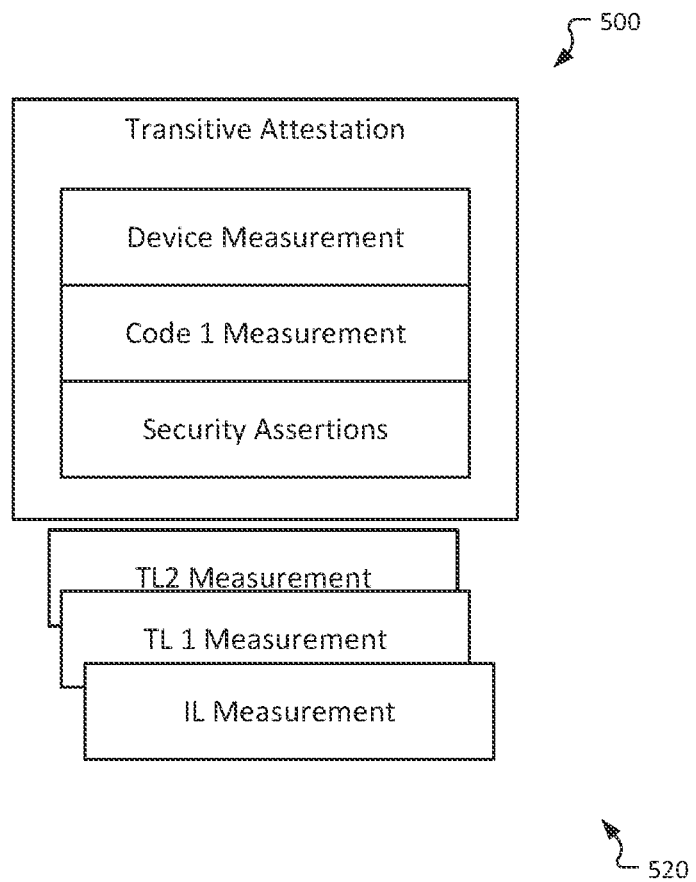
FIG. 5 is an illustration of a transitive attestation summarizing attestation by an attestable tool chain, according to some embodiments.

FIG. 5 is an illustration of a transitive attestation summarizing the attestation by an attestable tool chain, according to some embodiments. The transitive attestation is provided as a logical representation of the information shown in FIG. 4 when considered together. As shown in FIG. 5, a transitive attestation 500 may include a device measurement (the device being an end processing device, such as device 340 illustrated in FIG. 3); a code 1 measurement (Code 1 referring to the original business logic (machine code) provided for conversion (compilation or translation) by the cloud tool chain); and, if required, one or more security assertions.

In some embodiments, the transitive attestation includes or is associated with measurements from each stage of the cloud tool chain 520, wherein the measurements in this example are a TL 1 (Translation Logic 1) measurement, a TL 2 (Translation Logic 2) measurement, and an IL (Inspection Logic) measurement.

In this manner, the measurements and security assertions provide data that may be utilized to verify whether the code received for an operating device is derived from the original business logic, and that code has been generated by the stages of the tool chain.

Figure 6:
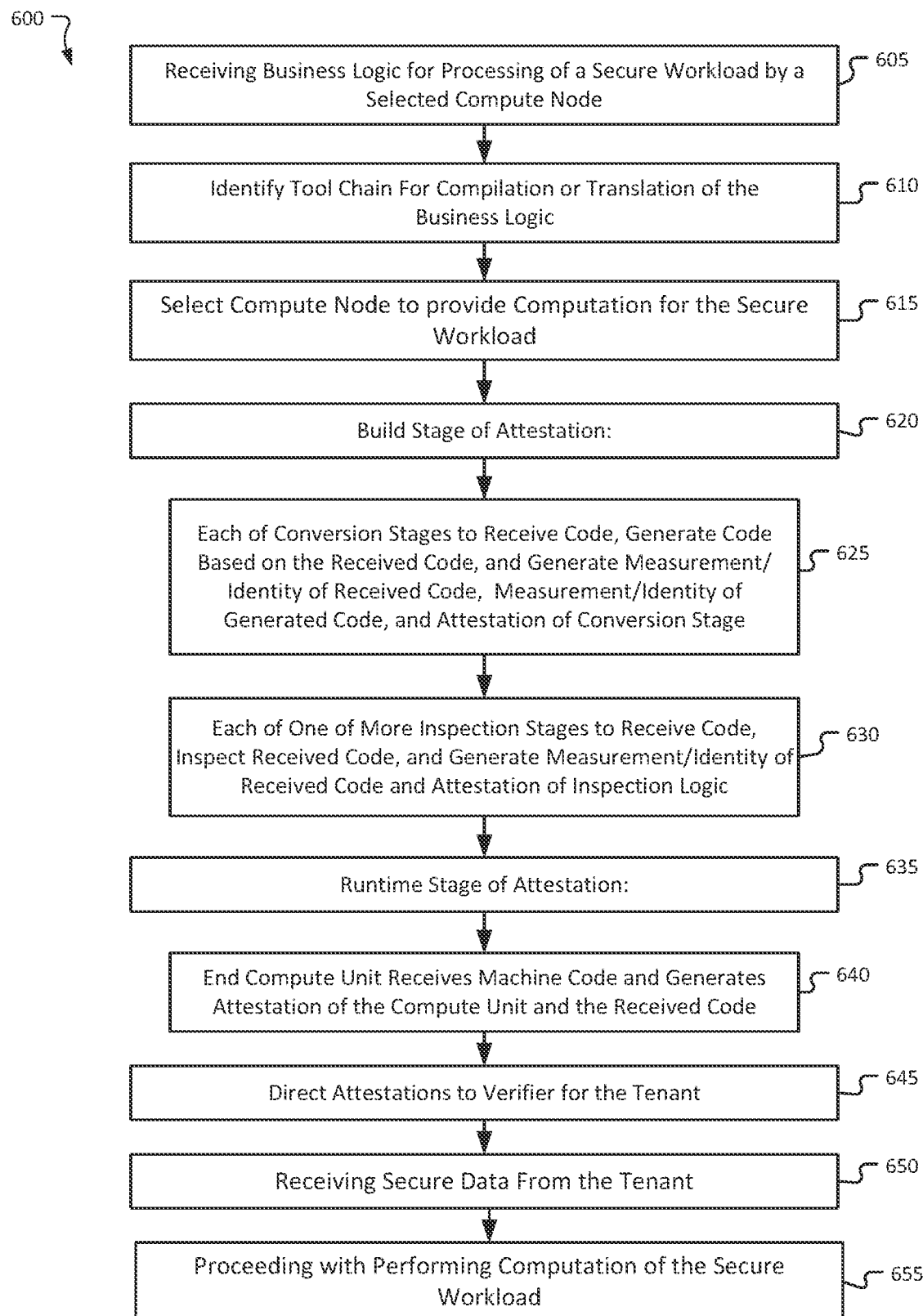
FIG. 6 is a flowchart to illustrate a process for attesting conversion or evaluation by an attestable tool chain, according to some embodiments.

FIG. 6 is a flowchart to illustrate a process for attesting conversion or evaluation by an attestable tool chain, according to some embodiments. In some embodiments, a process 600 includes receiving, such as at a cloud service provider or other third party, business logic for processing of a secure workload by a selected compute node 605, the secure workload being associated with a particular tenant.

In some embodiments, an attestable tool chain is identified for conversion of the business logic 610, and a compute node of multiple available compute nodes is selected to provide computation for the workload 615. A process may include selection of multiple compute nodes, wherein the tool chain may provide a separate conversion of the business logic (or portions of the business logic) for each of the multiple compute nodes.

In some embodiments, in a build stage of an attestation process 620 each of one or more conversion stages is to receive code, generate a code based on the received code, and generate a measurement or identity of the received code, a measurement or identity of the generated code, and an attestation of the conversion stage 625. In some embodiments, each of one or more inspection stages may further operate to receive and inspect code, and generate a measurement or identity of the received code and an attestation of the inspection stage 630.

In some embodiments, in a runtime stage of the attestation process 635, an end compute unit (i.e., the device to run received machine code) is to receive machine code, and to generate an attestation of the compute unit and of the received code 640.

In some embodiments, each of the attestations is to be directed to a verifier for the tenant 645, wherein the verifier may be tenant or a verifying agent acting on behalf of the tenant. In this way, the verifier receives a chain of attestations that together demonstrate that each attesting device is running logic that is derived from the original business logic, and that the result machine code was built by the indicated tool chain elements (the conversion stage elements). In this matter, a verification indicating that the resulting machine code for the end compute node is derived from the original machine logic may be generated without the tenant being required to be involved in the operation of the tool chain.

In some embodiments, if the attestations are sufficient for verification, then the process may then proceed with receiving secure data from the tenant 650, and performing the computation of the workload utilizing the received secure data 655.

FIG. 7 illustrates an embodiment of an exemplary computing architecture for attestation of operations by attestable tool chains, according to some embodiments. In various embodiments as described above, a computing architecture 700 may comprise or be implemented as part of an electronic device. In some embodiments, the computing architecture 700 may be representative, for example, of a computer system that implements one or more components of the operating environments described above. The computing architecture 700 may be utilized to provide attestation of operations by tool chains, such as described in FIGS. 1-6.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In one embodiment, the system 700 is a processing platform incorporated within a system-on-a- chip (SoC or SOC) integrated circuit for use in mobile, handheld, or embedded devices.

An embodiment of system 700 can include, or be incorporated within, a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory 704 is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 execute an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device, or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, Long Term Evolution (LTE), or 5G transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

Figure 8A:
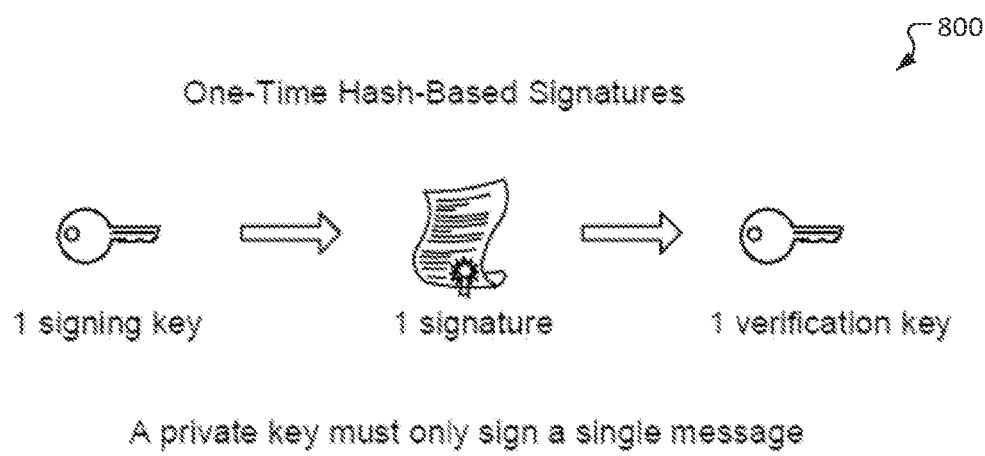
FIGS. 8A and 8B illustrate a one-time hash-based signatures scheme and a multi-time hash-based signatures scheme, respectively.
Figure 8B:
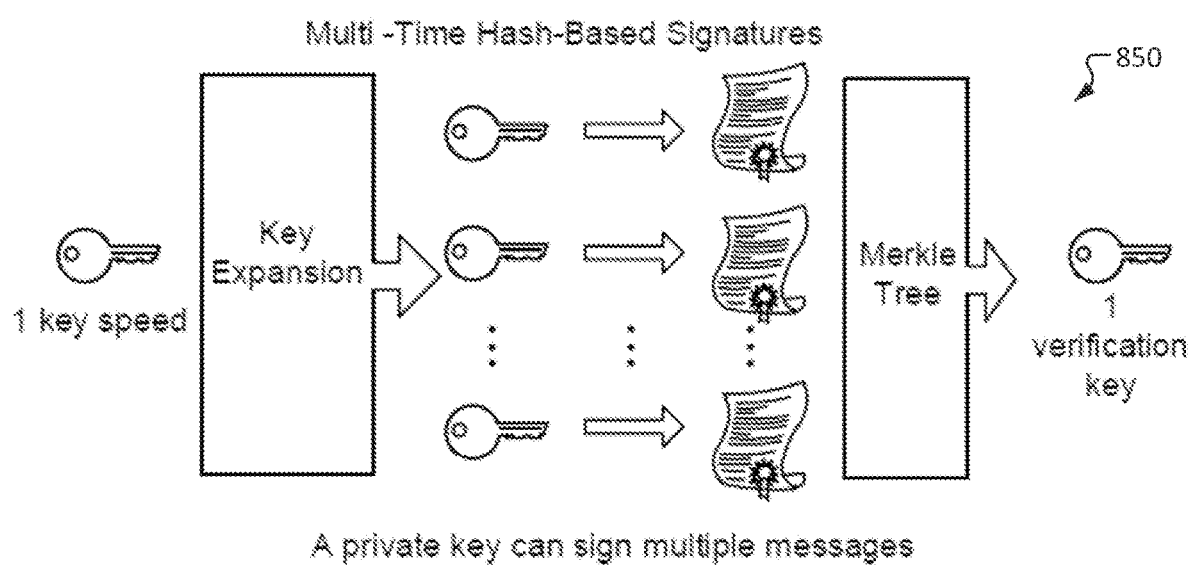

FIGS. 8A and 8B illustrate a one-time hash-based signatures scheme and a multi-time hash-based signatures scheme, respectively. The operations illustrated in FIGS. 8A and 8B may be utilized as required in providing security in support of attestation of operations by tool chains. Hash-based cryptography is based on cryptographic systems like Lamport signatures, Merkle Signatures, extended Merkle signature scheme (XMSS), SPHINCS scheme, SPHINCS+ scheme, etc. With the advent of quantum computing and in anticipation of its growth, there have been concerns about various challenges that quantum computing could pose and what could be done to counter such challenges using the area of cryptography.

One area that is being explored to counter quantum computing challenges is hash-based signatures (HBS) since these schemes have been around for a long while and possess the necessary basic ingredients, such as relying on symmetric cryptography building blocks (e.g., hash functions), to counter the quantum counting and post-quantum computing challenges. HBS schemes are regarded as fast signature algorithms working with fast platform secured-boot, which is regarded as the most resistant to quantum attacks.

For example, as illustrated with respect to FIG. 8A, a scheme of HBS is shown that uses Merkle trees along with one-time signature (OTS) scheme 800, such as using a private key to sign a message and a corresponding public key to verify the OTS message, where a private key only signs a single message.

Similarly, as illustrated with respect to FIG. 8B, another HBS scheme is shown, where this one relates to multi-time signatures (MTS) scheme 850, where a private key can sign multiple messages.

Figure 9A:
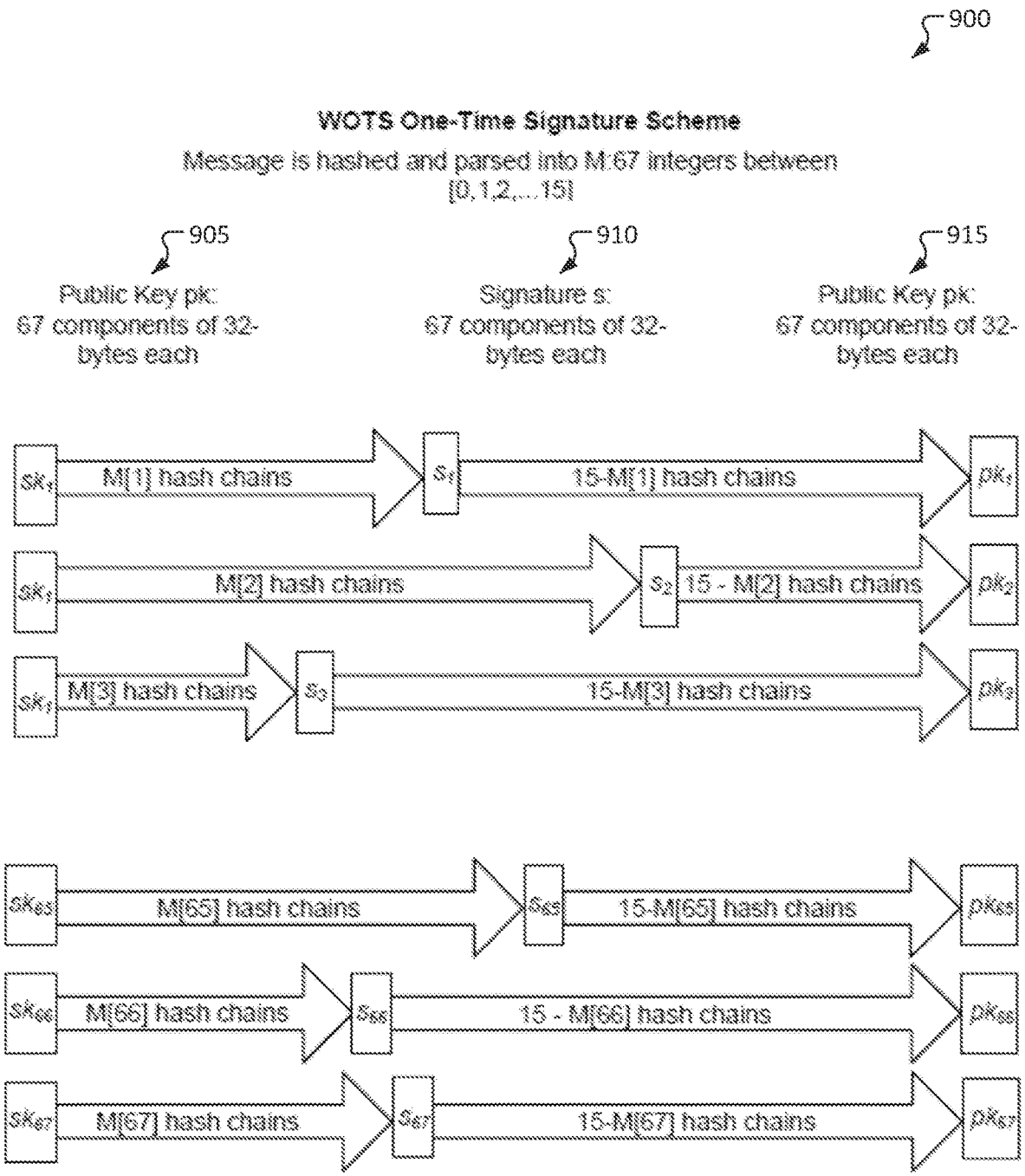
FIGS. 9A and 9B illustrate a one-time signature scheme and a multi-time signature scheme, respectively.
Figure 9B:
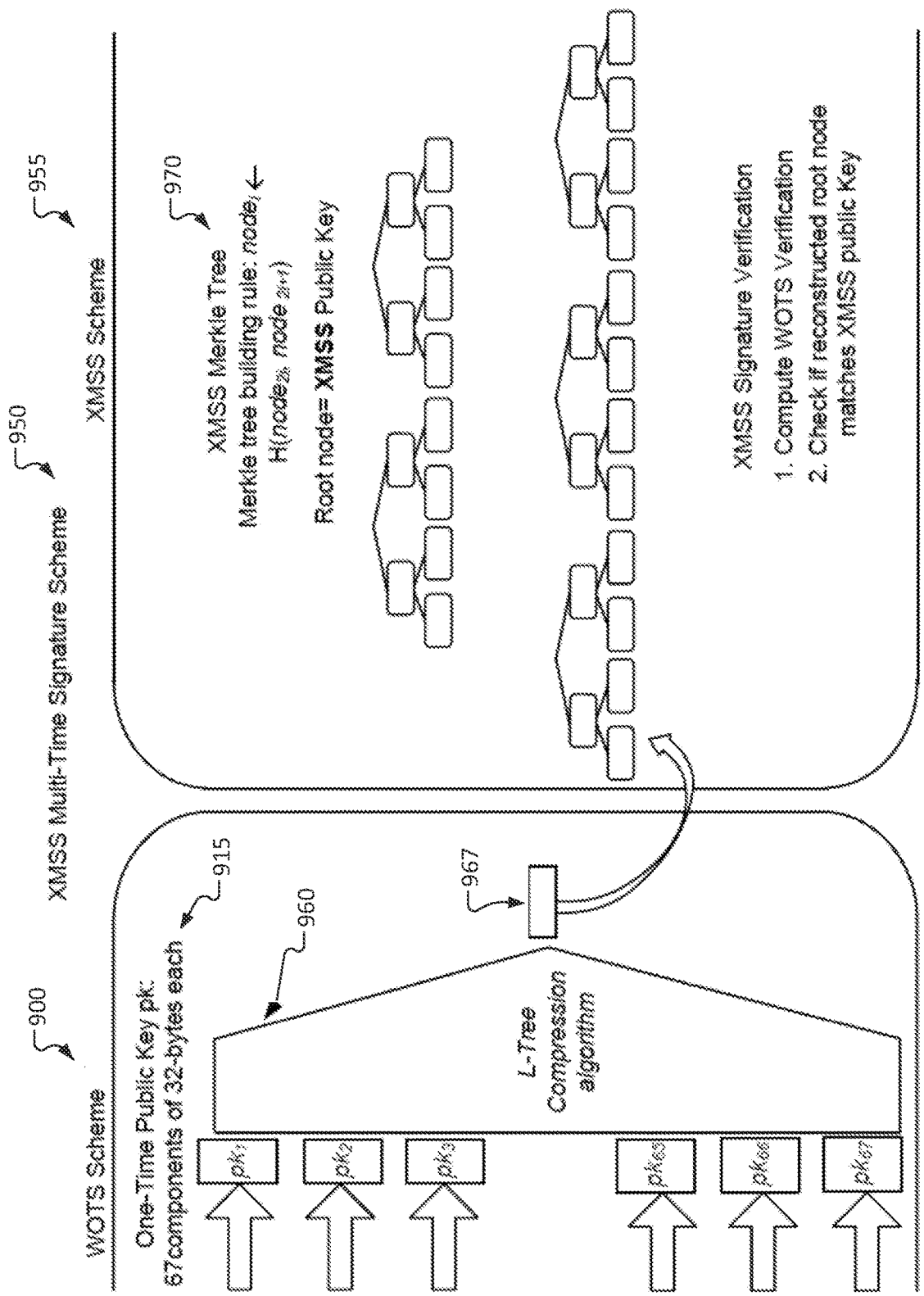

FIGS. 9A and 9B illustrate a one-time signature scheme and a multi-time signature scheme, respectively. Continuing with HBS-based OTS scheme 800 of FIG. 8A and MTS scheme 850 of FIG. 8B, FIG. 9A illustrates Winternitz OTS (WOTS) scheme 900, which was offered by Robert Winternitz of Stanford Mathematics Department, while FIG. 9B illustrates XMSS MTS scheme 950, respectively.

For example, WOTS scheme 900 of FIG. 9A provides for hashing and parsing of messages into M, with 67 integers between [0, 1, 2, . . . , 15], such as private key, sk, 905, signature, s, 910, and public key, pk, 915, with each having 67 components of 32 bytes each.

Now, for example, FIG. 9B illustrates XMSS MTS scheme 950 that allows for a combination of WOTS scheme 900 of FIG. 9A and XMSS scheme 955 having XMSS Merkle tree 970. As discussed previously with respect to FIG. 9A, WOTS scheme 900 is based on a one-time public key, pk, 915, having 67 components of 32 bytes each, that is then put through L-Tree compression algorithm 960 to offer WOTS compressed pk 967 to take a place in the XMSS Merkle tree 970 of XMSS scheme 955. It is contemplated that XMSS signature verification may include computing WOTS verification and checking to determine whether a reconstructed root node matches the XMSS public key, such as root node=XMSS public key.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may utilize one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but utilize addition of a library (e.g., a dynamic link library (DLL)), a software development kit (SDK), an application programming interface (API), etc. in order to execute the instructions on a particular computing device or other device. In another example, the machine readable instructions may be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9A and 9B and other figures may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order, or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following Examples pertain to further embodiments.

In Example 1, a storage medium includes instructions for receiving source code for processing of a secure workload of a tenant; selecting at least a first compute node of a plurality of compute nodes to provide computation for the workload; processing the source code by an attestable tool chain to generate machine code for the first compute node, including, in a first stage, performing one or more conversions of the source code by one or more convertors to generate converted code and generating an attestation associated with each code conversion, and, in a second stage, receiving machine code for the first compute node and generating an attestation associated with the first compute node; and providing each of the attestations from the first stage and the second stage for verification.

In Example 2, the first stage is a build stage and the second stage is a runtime stage for the processing of the source code.

In Example 3, the attestations from the first stage and the second stage represent a chain of attestations between the received source code and the generated machine code for the first compute node.

In Example 4, each attestation of the first stage includes at least a measurement or identity of received code, a measurement or identity of converted code, and an attestation of a convertor that converted the received code into the converted code.

In Example 5, at least a first attestation of the first stage further includes one or more security assertions.

In Example 6, the first stage further includes performing one or more inspections of the source code and generating an attestation associated with each code inspection.

In Example 7, the attestation of the second stage includes at least an attestation of received machine code and an attestation of the first compute node.

In Example 8, the storage medium further includes instructions for receiving secure data in response to the attestations of the first stage and the second stage for verification; and performing computation of the secure workload utilizing the received secure data.

In Example 9, a system includes one or more processors to process data; a memory to store data; and a plurality of compute units to provide computation for supported workloads, wherein the system is to receive source code for processing of a secure workload of a tenant at the CSP; select at least a first compute node of the plurality of compute nodes to provide computation for the workload; process the source code by an attestable tool chain associated with the tenant to generate machine code for the first compute node, including, in a first stage, perform one or more conversions of the source code by one or more convertors to generate converted code and generating an attestation associated with each code conversion, and, in a second stage, receive machine code for the first compute node and generating an attestation associated with the first compute node; and provide each of the attestations from the first stage and the second stage for verification.

In Example 10, the plurality of compute nodes includes one or more processing devices, one or more hardware accelerators, or both.

In Example 11, the first stage is a build stage and the second stage is a runtime stage for the processing of the source code.

In Example 12, the attestations from the first stage and the second stage represent a chain of attestations between the received source code and the generated machine code for the first compute node.

In Example 13, each attestation of the first stage includes at least a measurement or identity of received code, a measurement or identity of converted code, and an attestation of a convertor that converted the received code into the converted code.

In Example 14, at least a first attestation of the first stage further includes one or more security assertions.

In Example 15, the first stage further includes performing one or more inspections of the source code and generating an attestation associated with each code inspection.

In Example 16, the attestation of the second stage includes at least an attestation of received machine code and an attestation of the first compute node.

In Example 17, an apparatus includes one or more processors to process code; and a storage to store computer instructions, the computer instructions including instructions for receiving business logic for processing of a secure workload of a tenant, the apparatus including an attestable tool chain associated with the tenant; selecting one or more compute nodes of a plurality of compute nodes to provide computation for the workload; processing the business logic by the tool chain to generate machine code for the one or more compute nodes, including, in a build stage, performing one or more conversions of the business logic by one or more convertors to generate converted code and generating an attestation associated with each code conversion, and, in a runtime stage, receiving machine code for the one or more compute nodes and generating an attestation associated with each of the one or more compute nodes; providing each of the attestations from the build stage and the runtime stage for verification; and performing computation of the secure workload utilizing the one or more compute nodes.

In Example 18, the attestations from the build stage and the runtime stage represent a chain of attestations between the received business logic and the generated machine code for the one or more compute nodes.

In Example 19, each attestation of the build stage includes at least a measurement or identity of received code, a measurement or identity of converted code, and an attestation of a convertor that converted the received code into the converted code.

In Example 20, each attestation of the runtime stage includes at least an attestation of received machine code and an attestation of one of the one or more compute nodes.

In Example 21, an apparatus includes means for receiving source code for processing of a secure workload of a tenant; means for selecting at least a first compute node of a plurality of compute nodes to provide computation for the workload; means for processing the source code by an attestable tool chain to generate machine code for the first compute node, including, in a first stage, means for performing one or more conversions of the source code by one or more convertors to generate converted code and generating an attestation associated with each code conversion, and, in a second stage, means for receiving machine code for the first compute node and generating an attestation associated with the first compute node; and means for providing each of the attestations from the first stage and the second stage for verification.

In Example 22, the first stage is a build stage and the second stage is a runtime stage for the processing of the source code.

In Example 23, the attestations from the first stage and the second stage represent a chain of attestations between the received source code and the generated machine code for the first compute node.

In Example 24, each attestation of the first stage includes at least a measurement or identity of received code, a measurement or identity of converted code, and an attestation of a convertor that converted the received code into the converted code.

In Example 25, at least a first attestation of the first stage further includes one or more security assertions.

In Example 26, the first stage further includes performing one or more inspections of the source code and generating an attestation associated with each code inspection.

In Example 27, the attestation of the second stage includes at least an attestation of received machine code and an attestation of the first compute node.

In Example 28, the apparatus further includes means for receiving secure data in response to the attestations of the first stage and the second stage for verification; and means for performing computation of the secure workload utilizing the received secure data.

Specifics in the Examples may be used anywhere in one or more embodiments.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. One or more non-transitory computer-readable storage mediums having stored thereon executable computer program instructions that, when executed by one or more processors, cause the one or more processors to perform operations comprising:
receiving source code for processing of a secure workload of a tenant of a system;
selecting at least a first compute node of a plurality of compute nodes to provide computation for the secure workload; and
processing the source code by an attestable tool chain to generate machine code for the first compute node, the attestable tool chain being run from an attestable environment, wherein processing the source code by the attestable tool chain includes performing a plurality of conversions of the source code by a plurality of convertors of the attestable tool chain to generate converted code and an attestation associated with each code conversion, generating the attestation for each of the plurality of conversions by the attestable tool chain including generating:
a measurement or identity of received source code,
a measurement or identity of converted code that is converted from the source code, and
an attestation of a convertor that converted the received source code into the converted code.

2. The one or more non-transitory computer-readable storage mediums of claim 1, further comprising executable computer program instructions that, when executed by one or more processors, cause the one or more processors to perform operations comprising:
generating a chain of attestations for verification of processing by the attestable tool chain between the received source code and the generated machine code for the first compute node, the chain of attestations including each attestation generated by the attestable tool chain in connection with the generation of the machine code.

3. The one or more non-transitory computer-readable storage mediums of claim 2, further comprising executable computer program instructions that, when executed by one or more processors, cause the one or more processors to perform operations comprising:
providing the chain of attestations for verification of processing by the attestable tool chain on behalf of the tenant;
in response to approval of the verification, receiving secure data from the tenant; and
performing computation of the secure workload utilizing the received secure data.

4. The one or more non-transitory computer-readable storage mediums of claim 1, further comprising executable computer program instructions that, when executed by one or more processors, cause the one or more processors to perform operations comprising:
receiving the machine code generated for the first compute node and generating an attestation by the attestable tool chain, the attestation including:
a measurement or identity of received machine code, and
an attestation of the first compute code.

5. The one or more non-transitory computer-readable storage mediums of claim 1, wherein processing the source code by the attestable tool chain further includes performing one or more inspections of generated code and generating an attestation associated with each code inspection, wherein generating the attestation for each of the one or more inspections by the attestable tool chain includes generating:
a measurement or identity of received source code; and
an attestation of an inspector element that inspected the received source code.

6. The one or more non-transitory computer-readable storage mediums of claim 5, wherein generating the attestation for each of the one or more inspections by the attestable tool chain further includes generating:
one or more security assertions regarding the received source code.

7. The one or more non-transitory computer-readable storage mediums of claim 1, wherein generating the attestation by the attestable tool chain for each of the plurality of conversions further includes comparing one or more measurements generated for a convertor of the plurality of convertors to documentation including measurement data for the convertor.

8. A system comprising:
one or more processors to process data for a cloud computing platform;
a memory device to store data; and
a plurality of compute nodes to provide computation for supported workloads, the plurality of compute nodes including one or more graphics processing units (GPUs), one or more hardware accelerators, or both, wherein the system is to:
receive source code for processing of a secure workload of a tenant of a system;
select at least a first compute node of the plurality of compute nodes to provide computation for the secure workload; and
process the source code by an attestable tool chain to generate machine code for the first compute node, the attestable tool chain being run from an attestable environment, wherein processing the source code by the attestable tool chain includes performing a plurality of conversions of the source code by a plurality of convertors of the attestable tool chain to generate converted code and an attestation associated with each code conversion, generating the attestation for each of the plurality of conversions by the attestable tool chain including generating:
a measurement or identity of received source code,
a measurement or identity of converted code that is converted from the source code, and
an attestation of a convertor that converted the received source code into the converted code.

9. The system of claim 8, wherein the system is further to:
generate a chain of attestations for verification of processing by the attestable tool chain between the received source code and the generated machine code for the first compute node, the chain of attestations including each attestation generated by the attestable tool chain in connection with the generation of the machine code.

10. The system of claim 9, wherein the system is further to:
provide the chain of attestations for verification of processing by the attestable tool chain on behalf of the tenant;
in response to approval of the verification, receive secure data from the tenant; and
perform computation of the secure workload utilizing the received secure data.

11. The system of claim 8, wherein the system is further to:
receive the machine code generated for the first compute node and generate an attestation by the attestable tool chain, the attestation including:
a measurement or identity of received machine code, and
an attestation of the first compute code.

12. The system of claim 8, wherein processing the source code by the attestable tool chain further includes performing one or more inspections of generated code and generating an attestation associated with each code inspection, wherein generating the attestation for each of the one or more inspections by the attestable tool chain includes generating:
a measurement or identity of received source code; and
an attestation of an inspector element that inspected the received source code.

13. The system of claim 12, wherein generating the attestation for each of the one or more inspections by the attestable tool chain further includes generating:
one or more security assertions regarding the received source code.

14. The system of claim 8, wherein generating the attestation by the attestable tool chain for each of the plurality of conversions further includes comparing one or more measurements generated for a convertor of the plurality of convertors to documentation including measurement data for the convertor.

15. The system of claim 8, wherein the system is a cloud computing platform.

16. An apparatus comprising:
one or more processors to process code; and
a storage device to store computer instructions, the computer instructions including instructions for:
receiving source code for processing of a secure workload of a tenant of a system;
selecting at least a first compute node of a plurality of compute nodes to provide computation for the secure workload; and
processing the source code by an attestable tool chain to generate machine code for the first compute node, the attestable tool chain being run from an attestable environment, wherein processing the source code by the attestable tool chain includes performing a plurality of conversions of the source code by a plurality of convertors by the attestable tool chain to generate converted code and an attestation associated with each code conversion, generating the attestation for each of the plurality of conversions by the attestable tool chain including generating:
a measurement or identity of received source code,
a measurement or identity of converted code that is converted from the source code, and
an attestation of a convertor that converted the received source code into the converted code.

17. The apparatus of claim 16, wherein the computer instructions further include instructions for:
generating a chain of attestations for verification of processing by the attestable tool chain between the received source code and the generated machine code for the first compute node, the chain of attestations including each attestation generated by the attestable tool chain in connection with the generation of the machine code.

18. The apparatus of claim 17, wherein the computer instructions further include instructions for:
providing the chain of attestations for verification of processing by the attestable tool chain on behalf of the tenant;
in response to approval of the verification, receiving secure data from the tenant; and
performing computation of the secure workload utilizing the received secure data.

19. The apparatus of claim 16, wherein the computer instructions further include instructions for:
receiving the machine code generated for the first compute node and generating an attestation by the attestable tool chain, the attestation including:
a measurement or identity of received machine code, and
an attestation of the first compute code.

20. The apparatus of claim 16, wherein processing the source code by the attestable tool chain further includes performing one or more inspections of generated code and generating an attestation associated with each code inspection, wherein generating the attestation for each of the one or more inspections by the attestable tool chain includes generating:
- a measurement or identity of received source code; and
- an attestation of an inspector element that inspected the received source code.

* * * * *